(12) United States Patent
Tornare

(10) Patent No.: US 6,462,480 B1
(45) Date of Patent: Oct. 8, 2002

(54) METHOD AND DEVICE FOR DIAGNOSING THE PROPER FUNCTIONING OF A MOTOR VEHICLE ANTICRASH LIGHTS

(75) Inventor: Jean-Marc Tornare, Agen (FR)

(73) Assignee: Siemens VDO Automotive S.A.S, Toulouse (FR)

( * ) Notice: Subject to any disclaimer, the term of this patent is extended or adjusted under 35 U.S.C. 154(b) by 0 days.

(21) Appl. No.: 09/806,539

(22) PCT Filed: Sep. 24, 1999

(86) PCT No.: PCT/EP99/07153

§ 371 (c)(1),
(2), (4) Date: Mar. 28, 2001

(87) PCT Pub. No.: WO00/18610

PCT Pub. Date: Apr. 6, 2000

(30) Foreign Application Priority Data

Sep. 28, 1998 (FR) .............................................. 98 12091

(51) Int. Cl.$^7$ .................................................. B60Q 1/02
(52) U.S. Cl. ............................. 315/83; 315/82; 315/77; 340/853.2; 340/970; 340/471
(58) Field of Search .............................. 315/82, 83, 76, 315/77; 340/853.2, 907, 933, 471

(56) References Cited

U.S. PATENT DOCUMENTS 5,739,751 A * 4/1998 Ishihara et al. ............. 340/475

FOREIGN PATENT DOCUMENTS

| DE | 34 10 570 A1 | 10/1984 |
| DE | 42 34 271 A1 | 4/1994 |
| DE | 197 56 611 A1 | 7/1998 |
| FR | 2 468 481 | 5/1981 |

\* cited by examiner

*Primary Examiner*—Don Wong
*Assistant Examiner*—Tuyet T. Vo
(74) *Attorney, Agent, or Firm*—Laurence A. Greenberg; Werner H. Stemer; Ralph E. Locher

(57) ABSTRACT

A process for diagnosing the proper operation of direction indicator lights of a motor vehicle includes the steps of temporally and alternately shifting the end of illumination of the right and left change of direction indicator lamps of the vehicle, measuring the current passing through a power circuit of the direction indicator lamps during the temporal shift, comparing the measured value with a reference value, and deducing therefrom whether at least one of the lamps is inoperative and in this case informing the driver thereof. A device for diagnosing the proper operation of the direction indicator lights of a motor vehicle is also provided.

8 Claims, 2 Drawing Sheets

Fig. 1
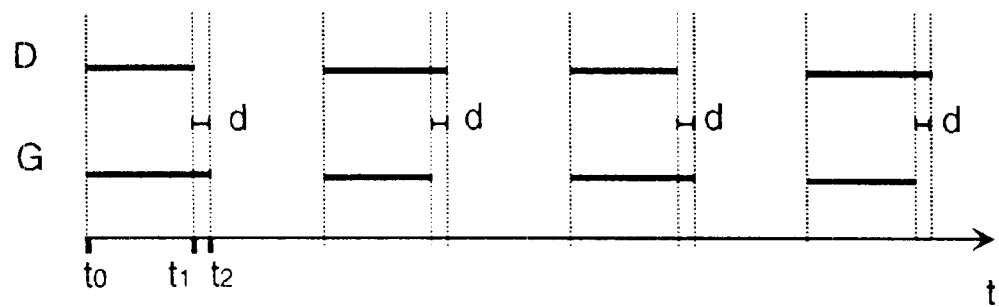
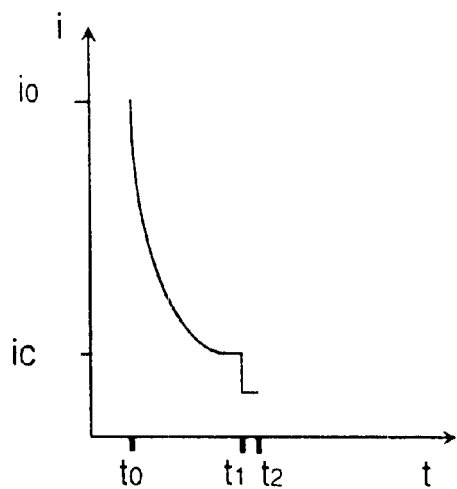
Fig. 2

METHOD AND DEVICE FOR DIAGNOSING THE PROPER FUNCTIONING OF A MOTOR VEHICLE ANTICRASH LIGHTS

BACKGROUND OF THE INVENTION

Field of the Invention

The present invention relates to a process and a device for diagnosing the proper operation of the lamps of hazard lights of a motor vehicle.

All motor vehicles sold at present are fitted with hazard lights. These lights are characterized by the simultaneous and cyclic illuminating of the change of direction indicator lamps (left and right blinkers) of the vehicle.

Such hazard lights are intended to be employed in order to inform vehicles located nearby of a hazard state of the vehicle which could impede the road traffic flow of other users (dangerous parking, breakdown, etc.).

It would appear to be useful to be able to diagnose the proper operation of these lights while they are actually in operation. Indeed, when the driver decides to switch on these hazard lights, it is to inform the other users of a potentially dangerous situation and it is vital that the hazard lights operate correctly so as to carry out the function assigned to them.

Hitherto, only the diagnosis of the proper operation of the blinkers was practiced. Accordingly, it was sufficient to read out the current passing through the circuit powering the blinkers to determine whether a lamp was defective. Indeed, under normal operation, in blinker mode, the left and right pathways are mutually exclusive. Thus, only the left pathway is powered in order to activate the left (front/rear) blinkers; likewise for the right pathway. Therefore, by performing a readout of current forming the sum of the currents passing through the two pathways and by returning the measurement performed solely on the powered pathway, one automatically determines on which side the inoperative lamp is located. This information is then forwarded to the driver by causing the blinker pilot situated on the dashboard and corresponding to the side exhibiting a detective lamp to blink more rapidly. Thus, a defective lamp detected on the left side causes a doubling of the frequency of blinking of the left pilot.

The diagnosis of the proper operation of the lamps of the hazard lights necessarily involving that of the blinker lamps, it would appear to be opportune to utilize the diagnosis of the blinkers in order to diagnose the hazard lights. Indeed, this makes it possible to dispense with any additional device. Unfortunately, since the diagnosis of the blinkers effects a simple readout of the current flowing through the two pathways, and since these two pathways are powered simultaneously (in the case of the hazard lights), it is impossible simply to use the diagnosis of the blinker function to diagnose the hazard lights. Indeed, in this case, it is no longer possible to determine the side exhibiting a defective lamp, and still more serious, the variations in internal resistance which are due to the cyclic powering of all the lamps are greater than those caused by a defective lamp. Therefore, it is not possible to use the device for diagnosing the blinkers to diagnose the hazard lights.

SUMMARY OF THE INVENTION

The aim of the present invention is to diagnose the hazard lights according to a process and a device which are as similar as possible to those used for the diagnosis of the blinkers.

Accordingly, the present invention relates to a process for diagnosing the proper operation of the lamps of hazard lights of a motor vehicle, said process being one which consists in:

- temporally and alternately shifting the end of illumination of the right and left change of direction indicator lamps of the vehicle,
- measuring the current passing through the power circuit of said hazard lamps during the temporal shift,
- comparing the measured value with a reference value, and
- deducing therefrom whether at least one of the lamps is inoperative and in this case informing the driver thereof.

The shifting of the end of illumination of the right and left indicator lamps makes it possible to perform the measurement of the current flowing inside the circuit solely for the time when only one of the sides is powered. Therefore, it is possible, when a defective lamp is detected, to signal which side of the vehicle this defective lamp is located on. Moreover, by performing this measurement of the current while some of the indicator lamps are powered (one side only) and only at the end of illumination of the lamps (that is to say when the current has stabilized at a low level inside the lamp), it is possible to avoid the variations in resistance of the lamps due to the inrush current at the start of illumination and, therefore, the measured variations in current are directly representative here of a defective lamp.

It will be observed that the alternate temporal shifting of the end of illumination makes it possible, during a first measurement, to determine the current flowing in the lamps situated on one side of the vehicle and, during the following measurement, to determine the current flowing in the lamps situated on the other side of the vehicle.

Of course, the temporal shift of the end of illumination of the lamps remains invisible to the naked eye. Therefore, the right and left blinkers light up at the same time and seem to go out at the same time (for an observer of the vehicle) whereas in fact they do indeed light up at the same time but go out one after the other.

To prevent the temporal shift from being perceptible to the eye, it is preferable for this shift to remain less than 50 ms. Preferably, it is of the order of 15 ms.

Advantageously, this alternate temporal shift and the measurement of the current passing through the lamps are performed continuously. Permanent diagnosis of the proper operation of the lamps of the hazard lights is thus achieved.

The present invention also relates to a corresponding diagnostic device.

Other subjects, characteristics and advantages of the present invention will become further apparent from the description which follows, by way of nonlimiting example, and with reference to the appended figures in which:

BRIEF DESCRIPTION OF THE DRAWINGS

FIG. 1 is a diagrammatic view illustrating the diagnostic process according to the present invention.

FIG. 2 is a diagrammatic view illustrating the strength of the current passing through a lamp during the illumination phase.

DESCRIPTION OF THE PREFERRED EMBODIMENTS

Figure 3:
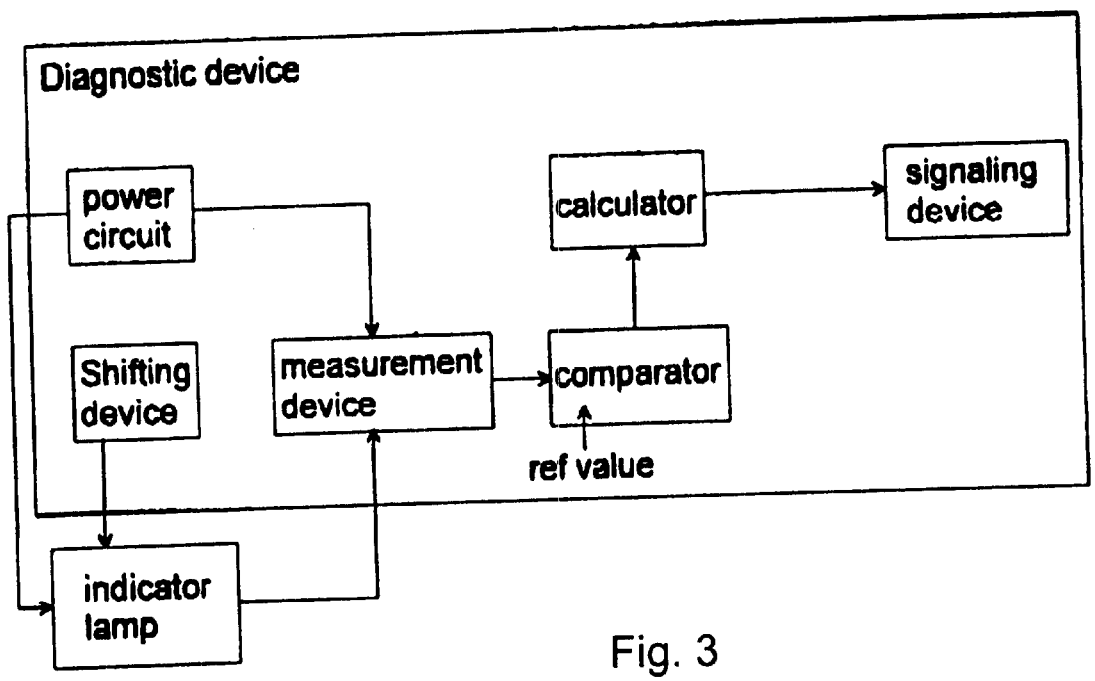
FIG. 3 is a block diagram of a diagnostic device according to the invention.

According to the embodiment illustrated in FIGS. 1 and 2, the process for diagnosing the lamps of the hazard lights, according to the present invention, consists in (in a first step) temporally and alternately shifting the end of illumination of the right and left change of direction indicator lamps of the vehicle.

As may be seen better in FIG. 1, the abscissa line represents time. At an instant to, the driver switches on the hazard lights. The upper line represented in FIG. 1 illustrates the duration of illumination of the right blinker lights, the lower line corresponds in the same way to the left blinkers. Upon switching on the hazard lights ($t_0$), the right and left blinkers are powered simultaneously.

In FIG. 2, it may be noted that the inrush current $i_0$ due to the simultaneous illuminating of the lamps is considerable. This inrush current rapidly loses its strength and rapidly stabilizes around the value $i_0$.

At the instant $t_2$ (FIG. 1), the powering of the right blinkers (in the example represented) is halted. For its part, the powering of the left blinkers is halted at the instant $t_2$. The interval of time d represents the temporal shift of the end of illumination of the right and left change of direction indicator lamps (blinkers).

Advantageously, during this time d, although only the left blinkers are powered, a reading of the strength of the current passing through all the lamps of the hazard lights is carried out in a conventional manner. Since only the left lamps are powered, the value of the strength measured is compared with a reference value and if this measured value is below the reference value, one deduces therefrom that at least one left lamp is inoperative. In this case, the driver is informed thereof, for example by doubling the frequency of blinking of the left pilot of the blinkers. This blinking pilot is that which is conventionally placed on the dashboard of the vehicle.

During the next illumination of the hazard lights, the powering of the left blinkers is halted first, followed by the right. Therefore, alternately, the powering of one pathway (right) and then the other (left) is halted and conversely in the following cycle.

Thus, at the end of the second illumination, the strength of the current flowing inside the lamps of the right blinkers of the vehicle is measured for the time d. Here again, if the measured value is below a reference value, one deduces therefrom that a right lamps is inoperative and the driver is informed thereof. Now it is the right pilot of the blinker which has its frequency doubled.

Advantageously, the temporal shift between the illuminating of the lamps of the right and left blinkers is produced at the end of the simultaneous illuminating of these lamps. The strength of the current flowing in the lamps may thus be expected to have stabilized for the performance of the measurement. Therefore, these variations in the current which are sensed at that moment are directly representative of faulty operation of a lamp. If this temporal shift had been performed at the moment of the powering of the lamps, the variations in the inrush current $i_0$ would have masked the faulty operation of the lamps, rendering any diagnosis of the hazard lights impossible at that moment.

It will be noted that the temporal shift produced between the left pathway and the right pathway at the end of illumination remains invisible to the naked eye. Thus, an observer will not be able to perceive that one of the pathways goes out before the other. Accordingly, the temporal shift d does not exceed 50 ms. Preferably, this temporal shift is of the order of 15 ms. With such a shift, the central calculating unit associated with the device for controlling the hazard lights is capable of correctly measuring the strength of the current, of comparing it, and of informing the driver of a malfunction.

Thus, the process for diagnosing the proper operation of the lamps of the hazard lights according to the present invention is one which consists in:

temporally and alternately shifting the end of illumination of the right and left change of direction indicator lamps of the vehicle, measuring the current passing through the power circuit of said hazard lamps during the temporal shift, comparing the measured value with a reference value, and deducing therefrom whether at least one of the lamps is inoperative and in this case informing the driver thereof.

Preferably, this diagnosis is carried out continuously throughout the duration of operation of the hazard lights.

It will be noted that this process is adapted for determining not only that at least one lamp of the hazard lights is inoperative, but also determines the side of the vehicle on which this inoperative lamp is located, and informs the driver thereof.

The present invention also relates to a corresponding diagnostic device. This device comprises:

a means of temporal and alternate shifting of the end of illumination of the right and left change of direction indicator lamps of the vehicle, a means of measuring the current passing through a power circuit of the hazard lamps during the temporal shift, a means of comparing the value of current measured with a reference value, a means of calculation adapted for deducing therefrom whether at least one lamp is inoperative, and a means informing the driver that at least one hazard lamp is inoperative.

FIG. 3 is block diagram of a diagnostic device implementing the method according to the invention, the diagnostic device includes:

a shifting device for temporally and alternately shifting an end of illumination of the right and left direction indicator lamps of the vehicle;

a measurement device connected to a power circuit of the indicator lamps for measuring a current passing through the power circuit a temporal shift effected by the shifting device;

a comparator connected to the measurement device for comparing a value of the current measured with a reference value;

a calculator adapted for deducing therefrom whether at least one lamp is inoperative; and a signaling device for informing a driver of the vehicle if at least one hazard lamp is inoperative.

Of course, the present invention is not limited to the embodiment described hereinabove and encompasses any variant within the scope of the person skilled in the art. Thus, the alternate temporal shift could make it possible to measure a quantity other than the strength of the current, insofar as this quantity would be representative of faulty operation of the lamps of the hazard lights.

What is claimed is:

1. A method of diagnosing a proper operation of direction indicator lights of a motor vehicle, which comprises:

temporally and alternately shifting an end of illumination of a right and left direction indicator lamps of a vehicle;

measuring a current passing through a power circuit of the direction indicator lamps during the temporal shift;

comparing the measured value with a reference value; and deducing therefrom whether at least one of the lamps is inoperative and, if so, issuing a corresponding signal.

2. The method according to claim 1, which comprises continuously performing the shifting, measuring, and deducing steps throughout a duration of operation of the direction indicator lights.

3. The method according to claim 1, which comprises determining a side of the vehicle containing an inoperative lamp and informing a driver of the vehicle accordingly.

4. The method according to claim 1, which comprises setting a duration of the temporal shift between the end of illumination of the right and left lamps such that the shift cannot be sensed by the naked eye.

5. A diagnostic device implementing the method according to claim 1, comprising:

a shifting device for temporally and alternately shifting an end of illumination of the right and left direction indicator lamps of the vehicle;

a measurement device connected to a power circuit of the indicator lamps for measuring a current passing through the power circuit a temporal shift effected by said shifting device;

a comparator connected to said measurement device for comparing a value of the current measured with a reference value;

a calculator adapted for deducing therefrom whether at least one lamp is inoperative; and a signaling device for informing a driver of the vehicle if at least one hazard lamp is inoperative.

6. The method according to claim 1, wherein the issuing step comprises informing a driver of a malfunction of the at least one of the lamps.

7. The method according to claim 6, which comprises shifting the end of illumination at most 50 ms.

8. The method according to claim 7, which comprises shifting the end of illumination substantially 15 ms.

* * * * *